(12) United States Patent
Sabandith et al.

(10) Patent No.: US 11,595,531 B2
(45) Date of Patent: Feb. 28, 2023

(54) SYSTEM AND METHOD FOR TONER CLASSIFICATION FROM DEVICE PRINTOUTS

(71) Applicant: Toshiba TEC Kabushiki Kaisha, Shinagawa-ku (JP)

(72) Inventors: Milong Sabandith, Irvine, CA (US); Gouse Basha Shaik, Walnut, CA (US)

( * ) Notice: Subject to any disclaimer, the term of this patent is extended or adjusted under 35 U.S.C. 154(b) by 0 days.

(21) Appl. No.: 17/380,290

(22) Filed: Jul. 20, 2021

(65) Prior Publication Data
US 2023/0023882 A1    Jan. 26, 2023

(51) Int. Cl.
*H04N 1/00* (2006.01)
*G06N 3/04* (2023.01)

(52) U.S. Cl.
CPC .......... *H04N 1/00039* (2013.01); *G06N 3/04* (2013.01)

(58) Field of Classification Search
CPC .................................................. H04N 1/00039
USPC ......................................................... 358/443
See application file for complete search history.

(56) References Cited

U.S. PATENT DOCUMENTS

| 2014/0192124 A1* | 7/2014 | Arima | B41J 2/4753 347/179 |
| 2016/0014286 A1* | 1/2016 | Kishida | H04N 1/00344 358/1.15 |
| 2019/0265611 A1* | 8/2019 | Stafford | G03G 15/0863 |

* cited by examiner

*Primary Examiner* — Jacky X Zheng
(74) *Attorney, Agent, or Firm* — Ulmer & Berne LLP; John X. Garred

(57) ABSTRACT

A system and method for toner classification from device printouts includes applying machine learning to electronic documents formed from scanned printout images. A training set is formed by scanning documents known to be printed with OEM toner, supplemented by scanning documents known to be printed with non-OEM toner. When new printouts are made, they are scanned and analyzed by an AI/ML server and classified as printed by OEM toner or by non-OEM toner.

18 Claims, 5 Drawing Sheets

SYSTEM AND METHOD FOR TONER CLASSIFICATION FROM DEVICE PRINTOUTS

TECHNICAL FIELD

This application relates generally to identification of a class of toner used in connection with scanning and analysis of printouts. The application relates more particularly to determining whether toner used in a printout was purchased from an original equipment manufacturer (OEM) or a third party manufacturer (non-OEM).

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

There are various types of problems a low quality, non-OEM toner or ink can cause to MFP's resulting in damage of the equipment over time. One prominent way non-OEM toner causes havoc on a printer, especially with refilled cartridges, is when toner powder or ink leaks into an inner working mechanism of the printer which ends up ultimately damaging it. Low quality, non-OEM toner or ink can cause MFP problems when it is not of the same quality or does not meet the printer manufacturer specifications. There are incompatibility issues which may not be visible to the naked eye when pages are printed, but which will eventually in the long run cause damage to the printer head.

The non-OEM toner is lower quality and will produce lower quality output. This may result in additional service calls to determine the cause and remedy. Hence usage of bad (non-OEM) toner not only gives poor print quality jobs but also results in the potential of causing damage to printer equipment.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As used herein, example embodiments may be directed to replacement toner. It is to be understood that such embodiments also apply to devices using ink.

In accordance with example embodiments herein, deep neural network algorithms using machine learning analyze printout images to determine if an MFP device is using OEM or non-OEM toner. This helps in identifying a good or bad toner condition (Good/Bad) from an output of printed pages.

Example embodiments herein disclose a process or technique for automated image classification of OEM and non-OEM toner printouts. A modern deep neural network suitably comprised of a convolutional neural network (CNN) Image Classification-, functions to apply machine learning to evaluate quality of printer output images and predict whether toner used for the printout is OEM or non-OEM. Third party toner such as non-OEM or Remanufactured Toner/ink cartridges typically offer a significantly lower print quality. While third party toner cartridges from different manufacturers can be of relative higher or lower quality, some are better than others. However, it is rare that third party toner is as good as OEM toner.

In an example embodiment herein, machine learning functions to evaluate the quality of printer output images. In this implementation we follow certain standard processes of Machine Learning:

1) Input: Input comprises of a collection of various OEM and non-OEM toner printed images. Each toner is associated with one of its distinctive classes, such as OEM or non-OEM type toner types. This data is referred to as the training set.

2) Learning Stage (Deep Learning Techniques): These include tasks to utilize the above training set to realize what each one of the classes resembles. This step is referred to as training a classifier, or deep learning a model.

3) Evaluation: In the end, the nature of the classifier asking it to predict labels for a new set of images that it has never seen before is evaluated. True labels of these images are then compared to the ones anticipated by the classifier.

Figure 1:
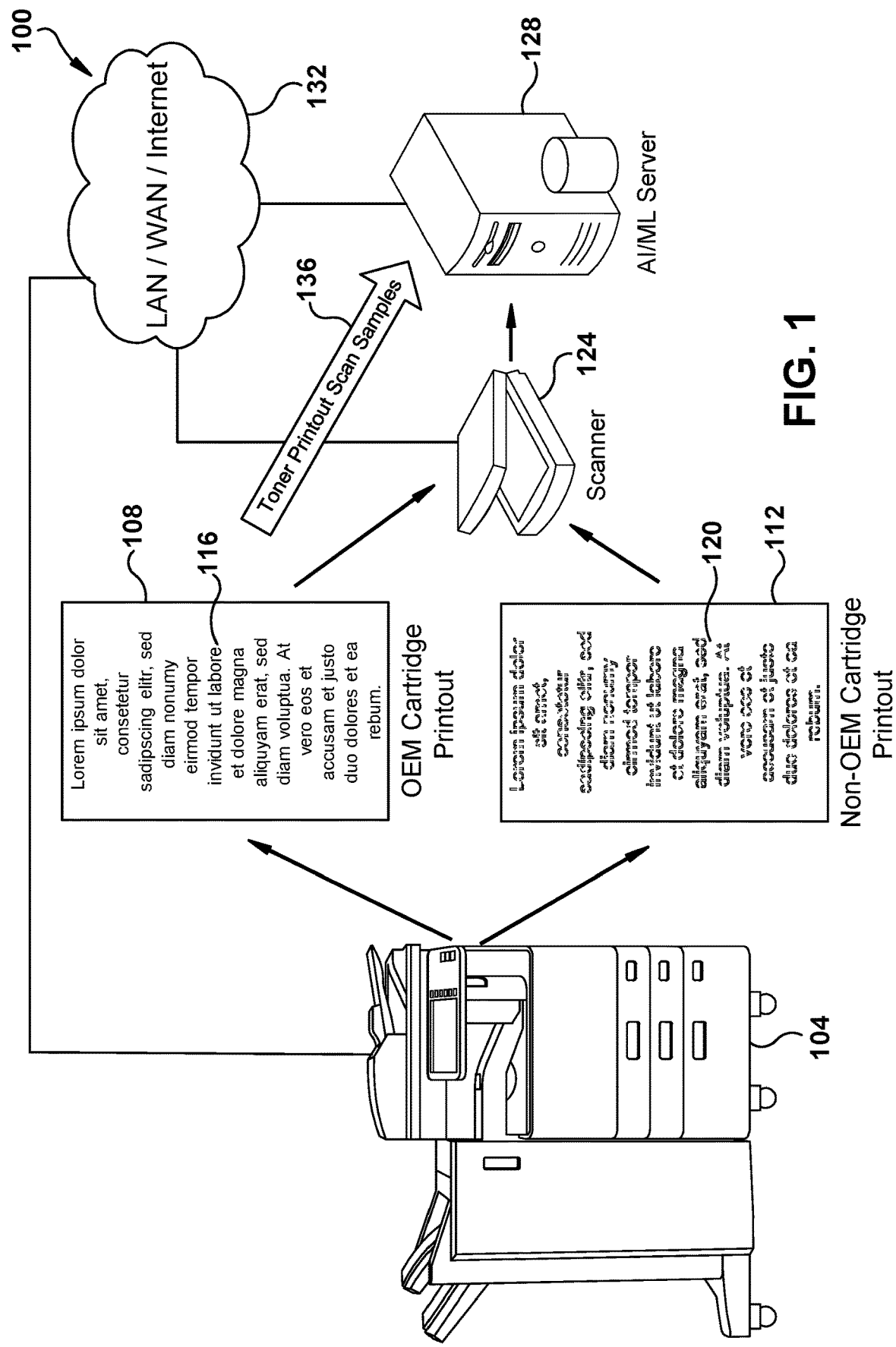
FIG. 1 an example embodiment of a system for toner classification from device printouts.

FIG. 1 illustrates an example embodiment of a system 100 for toner classification from device printouts. One or more MFPs, such as MFP 104, include toner which may or may not be OEM supplied toner. In the illustrated example, document 108 is printed with OEM toner, while document 112 is not. Page printout image 116 of document 108 has superior quality to image 120 of document 112. Image quality differences may or may not be apparent to an ordinary observer. Images can be character based, pictorial, drawings, or any other viewable image. Documents, such as documents 108 and 112, are scanned by scanner 124 which may be a standalone scanner, digital camera or an integrated scanner in and MFP such as MFP 104. MFP 104 and scanner 124 are in data communication with artificial intelligence/machine learning (AI/ML) server 128 via network cloud 132. Network cloud 132 is suitably comprised of a local area network (LAN), wide area network (WAN) which may comprise the Internet, or any suitable combination thereof.

Server 128 includes a training set 136 of sample printout scans for which toner has been identified as coming from an OEM or from a non-OEM source. Server 128 includes any suitable AI/ML system, such as TensorFlow, Google Cloud ML Engine, Amazon Machine Learning (AML), Accord.net, Apache Mahout, or any other suitable platform. It is to be understood that server 128 may also include a training set where non-OEM toner types are further classified by identified manufacturers, allowing for further refinement, such as when a non-OEM toner may have sufficient quality to be used, even though it suffers from somewhat diminished quality to images from OEM toner.

Figure 2:
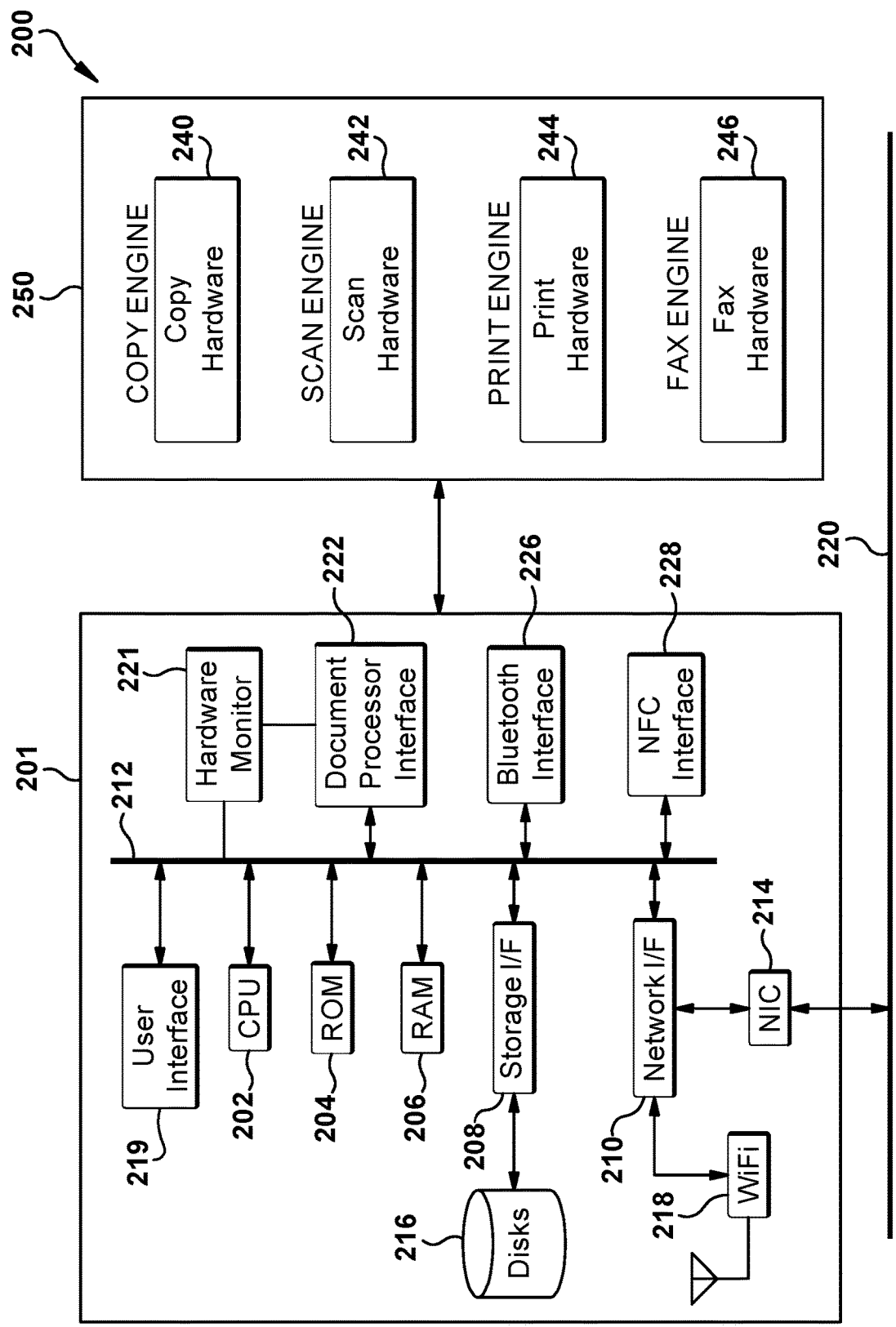
FIG. 2 is an example embodiment of a networked digital device, such as an MFP.

Turning now to FIG. 2, illustrated is an example embodiment of a networked digital device comprised of document rendering system 200 suitably comprised within an MFP, such as with MFPs 104 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication for interfacing with user peripherals, such as displays, keyboards, mice, track balls, touch screens, or the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
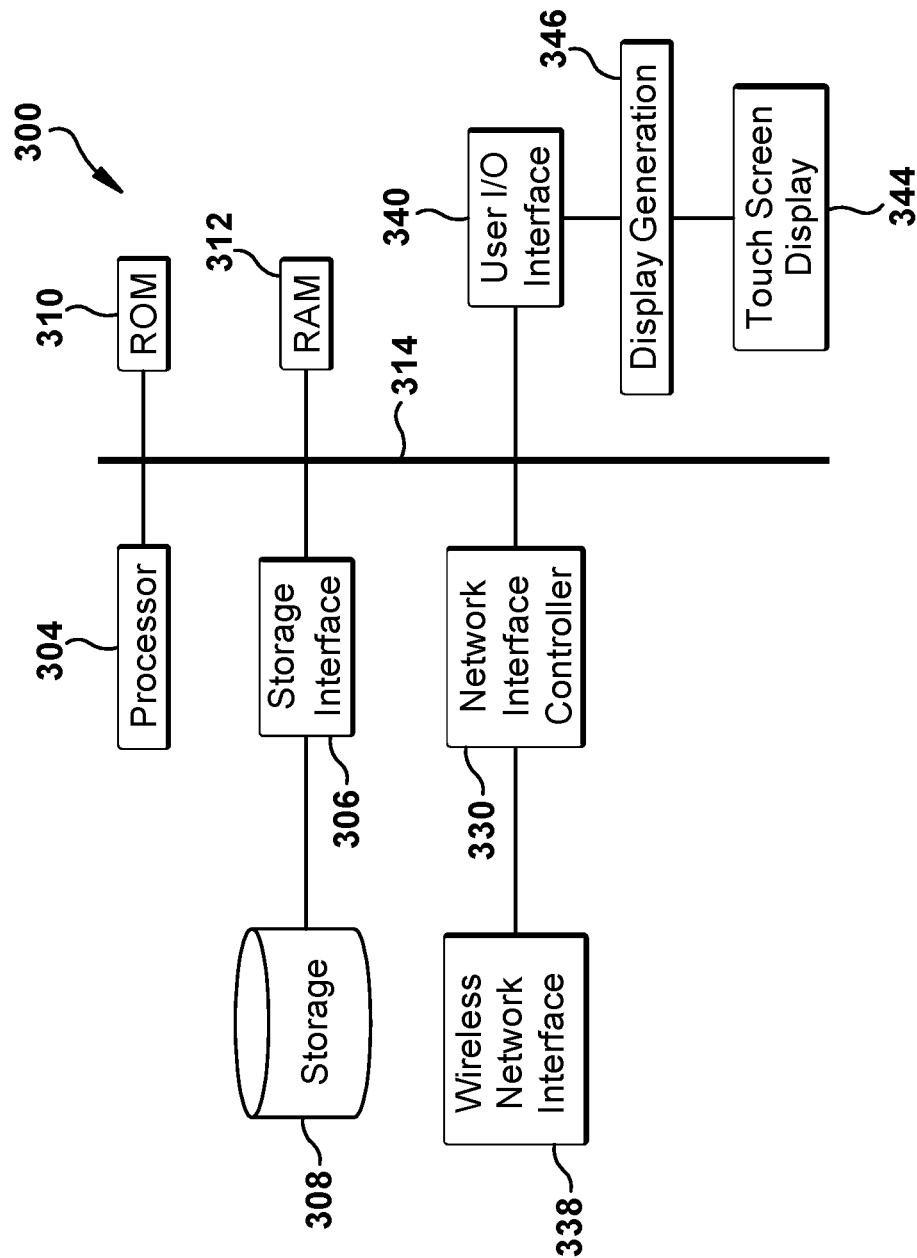
FIG. 3 is an example embodiment of a digital device system, such as a server.

Turning now to FIG. 3, illustrated is an example embodiment of a digital data processing device 300 such as server 128 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generation 346 providing a user interface via touch-screen display 344, suitably displaying images from display generator 346. It will be understood that the computational platform to realize the system as detailed further below is suitably implemented on any or all of devices as described above.

Figure 4:
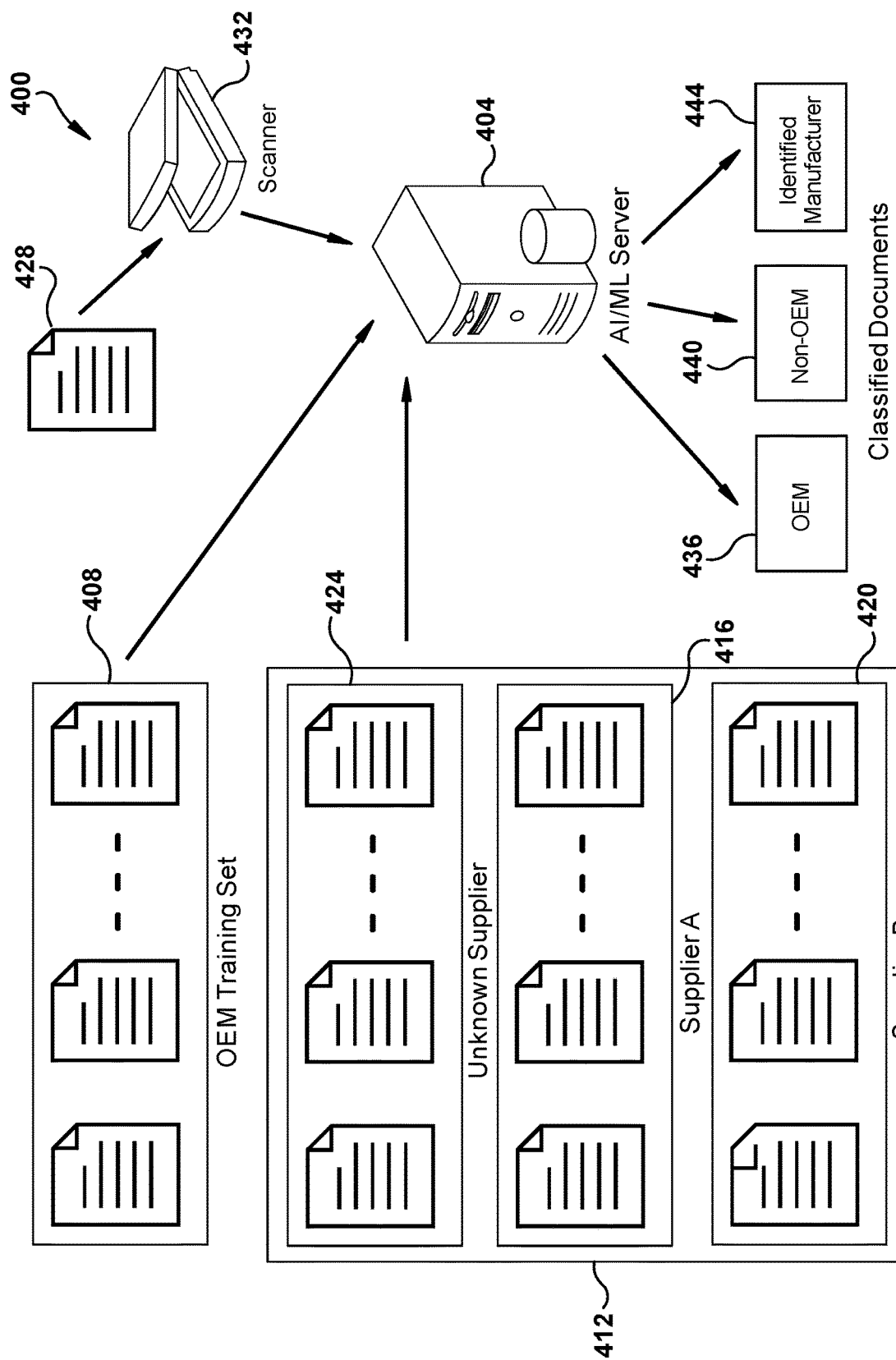
FIG. 4 is an example embodiment of machine learning training for artificial intelligence/machine learning.

FIG. 4 illustrates an example embodiment of machine learning training 400 for AI/ML server 404. Training is accomplished by scanning documents of OEM training set 408, all of which were printed with OEM toner. Training is further accomplished by scanning documents of training set 412, all of which are printed with non-OEM toner. Training set 412 may also include training sets for known toner suppliers, such as with training sets 416 and 420, or for unknown suppliers, such as with training set 424. With a trained model, newly scanned printouts, such as when document 428 is scanned by scanner 432 can be classified, such as OEM toner printouts 436, non-OEM printouts 440 and/or identified manufacture printouts 444.

Figure 5:
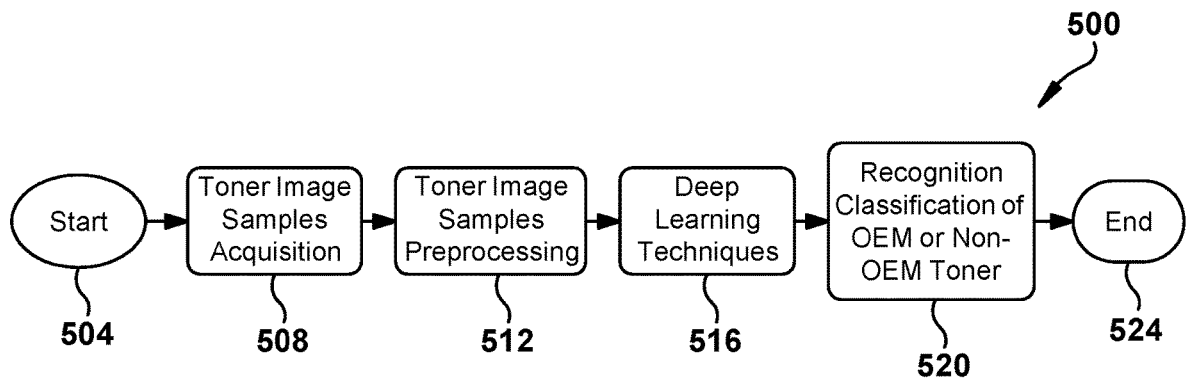
FIG. 5 is an example embodiment of a system flow diagram for toner classification from device printouts.

FIG. 5 illustrates an example embodiment system flow diagram 500 for toner classification from device printouts. The system commences at block 504 and proceeds to block 508 where toner image samples are acquired. Acquired toner image samples may be preprocessed at block 512 to form augmented image scans, such as augmented image scans in accordance with a rotation, flip, shift or crop of images in the OEM scan file or images in the non-OEM scan file. Deep learning is applied at block 516 and classification of newly scanned images is completed at block 520. The process ends at block 524.

Figure 6:
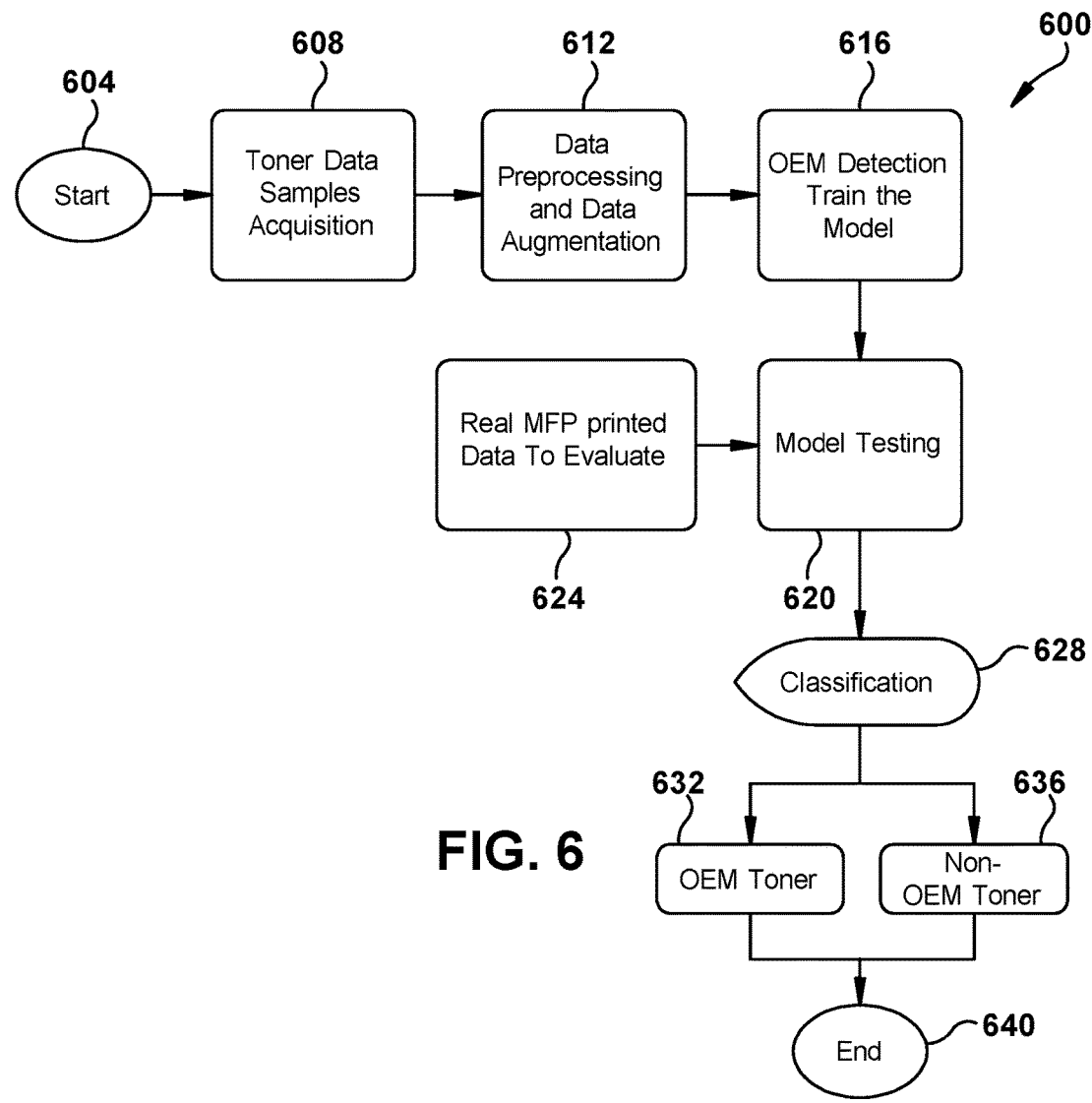
FIG. 6 is an example embodiment of a flowchart for toner classification from device printouts.

FIG. 6 illustrates an example embodiment of a flowchart 600 for toner classification from device printouts. The process commences at block 604 and proceeds to block 608 where toner data samples are acquired. Data preprocessing or augmentation is completed at block 612 and OEM detection training is completed at block 616. Resulting data is subject to model testing at block 620, supplemented with MFP printed data from block 624. Classification of documents is completed at block 628. Documents are classified as OEM toner documents at block 632 or non-OEM toner documents at block 636. The process ends at block 640 when classification is complete.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:
1. A system comprising:
a user interface including a display,
a processor;
memory storing classification data corresponding to a plurality of base image scans, each base image scan being associated with an OEM toner manufacturer or a non-OEM toner manufacturer;
the processor configured to classify OEM image scans and non-OEM image scans;
a scanner configured to generate an electronic image from an associated printout;
the processor further configured to selectively classify the electronic image as a print made from OEM manufactured toner in accordance with analysis relative to classified image scans;

the processor further configured to generate an image on the user interface identifying whether the associated printout was made from OEM manufactured toner, and the processor further configured to classify the image scans in accordance with application of machine learning to a training set formed from the classification data.

2. The system of claim 1 wherein the processor is further configured to generate augmented image scans for each of the plurality of image scans, each augmented image scan being associated with an OEM or non-OEM toner manufacture in accordance with an associated base image scan.

3. The system of claim 2 wherein the processor is further configured to generate the augmented image scans in accordance with a rotation, flip, shift or crop of the associated base image scan.

4. The system of claim 1 wherein the processor is further configured to identify a non-OEM toner manufacturer.

5. The system of claim 1 wherein the processor is further configured to output a warning on the display when a printout was made by a non-OEM toner manufacturer.

6. The system of claim 1 wherein the processor is further configured to determine acceptability of non-OEM toner and generate a corresponding image on the display.

7. The system of claim 1 wherein the processor is further configured update the training set in accordance with a classification of the electronic image.

8. A method comprising:
storing, in s memory, classification data corresponding to a plurality of base image scans, each base image scan being associated with an OEM toner manufacturer or a non-OEM toner manufacturer;
classifying, via a processor, OEM image scans and non-OEM image scans;
scanning a printout configured to generate an electronic image;
selectively classifying the electronic image as a print made from OEM manufactured toner in accordance with analysis relative to classified image scans;
generating an image on a user interface identifying whether the printout was made from OEM manufactured toner; and
classify the image scans in accordance with application of machine learning to a training set formed from the classification data.

9. The method of claim 8 further comprising generating augmented image scans for each of the plurality of image scans, each augmented image scan being associated with an OEM or non-OEM toner manufacture in accordance with an associated base image scan.

10. The method of claim 9 further comprising generating the augmented image scans in accordance with a rotation, flip, shift or crop of the associated base image scan.

11. The method of claim 8 further comprising identifying a non-OEM toner manufacturer.

12. The method of claim 8 further comprising outputting a warning on the display when the printout was made by a non-OEM toner manufacturer.

13. The method of claim 8 further comprising determining acceptability of non-OEM toner and generate a corresponding image on the display.

14. The method of claim 8 further comprising updating the training set in accordance with a classification of the electronic image.

15. A method comprising:
receiving a plurality of printouts, the printouts including printouts using OEM toner and printouts using non-OEM toner;
scanning each printout using the OEM toner into an associated OEM scan file;
scanning each printout using the non-OEM toner into an associated non-OEM scan file;
applying machine learning to the OEM scan file and the non-OEM scan file to generate an OEM classification and a non-OEM classification;
scanning a document printout associated with a toner of unknown origin into an associated document scan file;
classifying the document printout as printed with the OEM toner or the non-OEM toner in accordance with analysis of the associated document scan file relative to applied machine learning; and
generating a display indicative of a classification of the document printout.

16. The method of claim 15 further comprising:
generating augmented image scans for some or all the associated OEM scan files and the associated non-OEM scan files; and
applying machine learning to the augmented image scans to generate a modified OEM classification and a modified non-OEM classification.

17. The method of claim 16 further comprising generating the augmented image scans in accordance with a rotation, flip, shift or crop of images in the OEM scan file or images in the non-OEM scan file.

18. The method of claim 15 wherein machine learning is comprised of a convolutional neural network.

* * * * *